United States Patent
Iwashita et al.

(10) Patent No.: US 6,657,008 B2
(45) Date of Patent: *Dec. 2, 2003

(54) FLAME RETARDANT POLYSTYRENIC RESIN COMPOSITION

(75) Inventors: Tohru Iwashita, Ichihara (JP); Shinichi Miura, Ichihara (JP)

(73) Assignee: Idemitsu Kosan Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 08/945,273
(22) PCT Filed: Apr. 26, 1996
(86) PCT No.: PCT/JP96/01162
§ 371 (c)(1),
(2), (4) Date: Oct. 27, 1997
(87) PCT Pub. No.: WO96/34049
PCT Pub. Date: Oct. 31, 1996

(65) Prior Publication Data
US 2002/0103298 A1 Aug. 1, 2002

(30) Foreign Application Priority Data
Apr. 28, 1995 (JP) ............................................. 7-105660

(51) Int. Cl.$^7$ .......................... C08L 25/04; C08L 25/06; C08L 25/18; C08L 51/04
(52) U.S. Cl. ..................... 525/175; 525/176; 525/177; 525/178; 525/183; 525/184
(58) Field of Search ................................ 525/175, 176, 525/177, 178, 183, 184

(56) References Cited

U.S. PATENT DOCUMENTS

| 5,543,452 A | * | 8/1996 | Nakahashi | 524/430 |
| 5,760,105 A | * | 6/1998 | Okada | 523/201 |
| 5,777,021 A | * | 7/1998 | Nakano | 524/508 |
| 6,087,435 A | * | 7/2000 | Nakano et al. | 525/176 |

FOREIGN PATENT DOCUMENTS

| EP | 0 384 208 | 8/1990 |
| EP | 0 608 007 | 7/1994 |

OTHER PUBLICATIONS

Chemical Abstracts, vol. 123, No. 2, Jul. 10, 1995, AN 11259, JP 06 275 929, Sep. 30, 1994.

* cited by examiner

*Primary Examiner*—Donald R. Wilson
(74) *Attorney, Agent, or Firm*—Oblon, Spivak, McClelland, Maier & Neustadt, P.C.

(57) ABSTRACT

Flame retardant resin composition comprising (a) an SPS, (b) a thermoplastic resin having a reactive polar group, (c) a compatibilizing agent having compatibility with the component (a) and a polar group capable of reacting with the component (b), (d) a flame retardant and (e) a flame retardant auxiliary, a weight ratio of the component (a)/the component (b) being less than 1.5, the amount of the component (c) being in the range of 0.5 to 10% by weight with respect to 100% by weight of the total of the components (a), (b) and (c), the amount of the component (d) being 10 parts by weight or more and the amount of the component (e) being 3 parts by weight or more with respect to 100 parts by weight of the total of the components (a), (b) and (c).

2 Claims, No Drawings

FLAME RETARDANT POLYSTYRENIC RESIN COMPOSITION

TECHNICAL FIELD

The present invention relates to a flame retardant resin composition, and more specifically, it relates to a syndiotactic polystyrenic resin composition having an excellent stiffness, heat resistance, impact resistance and water resistance as well as a high flame retardancy which can suitably be used as industrial materials such as electric and electronic materials, industrial structure materials, automobile parts, appliance parts and mechanical parts.

BACKGROUND ART

A styrenic polymer (hereinafter abbreviated to "SPS" sometimes) having a syndiotactic configuration is excellent in heat resistance, chemical resistance, water resistance, acid resistance and alkali resistance, but it is poor in impact resistance. For this reason, the application range of the styrenic polymer as a material has heretofore been limited. On the other hand, a polymer such as a polyamide having a polar group is excellent in moldability and heat resistance, but it is hygroscopic. When the polyamide absorbs water, the physical properties of the polyamide change, and they also noticeably deteriorate due to the presence of an acid or an alkali. Accordingly, it has been desired to overcome such drawbacks.

In order to solve these problems, the formation of an alloy of the SPS and the polyamide has been suggested (Japanese Patent Application Laid-open No. 25795/1987). However, the alloy of the SPS and the polyamide is poor in flame retardancy, and therefore it cannot be used as a material which requires the flame retardancy. In recent years, the flame retardancy has been required in many fields, and the development of the flame retardant alloy has been desired. However, in the case that a flame retardant is added to the alloy comprising the SPS and the polyamide alone, it cannot be achieved to impart the flame retardancy to the alloy, keeping up mechanical properties such as toughness.

Under such circumstances, the present invention has been intended, and an object of the present invention is to provide a resin composition maintaining excellent characteristics of the SPS and having a high flame retardancy.

DISCLOSURE OF THE INVENTION

The present inventors have intensively researched, and as a result, it has been found that the above-mentioned object can be achieved by a composition obtained by adding a flame retardant to a resin composition comprising an SPS, a thermoplastic resin having a reactive polar group and a specific compatibilizing agent in a predetermined ratio, or a composition obtained by further blending a specific rubbery elastomer and/or a specific core shell type particulate elastomer with the above-mentioned composition. The present invention has been completed on the basis of such a knowledge.

That is to say, the first aspect of the present invention is directed to a flame retardant resin composition which comprises (a) a styrenic polymer having a syndiotactic configuration, (b) a thermoplastic resin having a reactive polar group, preferably a polyamide, (c) a compatibilizing agent having compatibility with the component (a) and a polar group capable of reacting with the component (b), (d) a flame retardant and (e) a flame retardant auxiliary, a weight ratio of the component (a)/the component (b) being less than 1.5, the amount of the component (c) being in the range of 0.5 to 10% by weight with respect to 100% by weight of the total of the components (a), (b) and (c), the amount of the component (d) being 10 parts by weight or more and the amount of the component (e) being 3 parts by weight or more with respect to 100 parts by weight of the total of the components (a), (b) and (c).

The second aspect of the present invention is directed to a flame retardant resin composition which comprises the above-mentioned flame retardant resin composition, (f) a rubbery elastomer having a polar group capable of reacting with the component (b) and a portion compatible with the component (a) and/or (g) a core shell type particulate elastomer having a siloxane.

The third aspect of the present invention is directed to a flame retardant resin composition which comprises the above-mentioned flame retardant resin composition comprising the components (a), (b), (c), (d), (e), (f) and (g), and (h) an inorganic filler.

BEST MODE FOR CARRYING OUT THE INVENTION

A resin composition of the present invention, as described above, comprises (a) a styrenic polymer having a syndiotactic configuration, (b) a thermoplastic resin having a reactive polar group, (c) a compatibilizing agent having compatibility with the component (a) and a polar group capable of reacting with the component (b), (d) a flame retardant and (e) a flame retardant auxiliary.

In the styrenic polymer having the syndiotactic configuration which can be used as the component (a), the syndiotactic configuration means that its stereochemical structure has a syndiotactic configuration, i.e., a steric structure in which phenyl groups and substituted phenyl groups which are side chains are located alternately in opposite directions on a main chain comprising carbon—carbon bonds. Its tacticity can be quantitatively determined by a nuclear magnetic resonance method using an isotopic carbon (a $^{13}C$—NMR method). The tacticity which can be determined by the $^{13}C$—NMR method can be called as follows in accordance with the number of existing plural continuous constitutional units. For example, in the case that the continuous units are two, the tacticity is called a diad; in the case that the continuous units are three, it is called a triad; and in the case that the continuous units are five, it is called a pentad. The styrenic polymer having the syndiotactic configuration referred to in the present invention is polystyrene, a poly(alkylstyrene), a poly(halogenated styrene), a poly(halogenated alkylstyrene), a poly(alkoxystyrene), a poly(vinyl benzoate), a hydrogenated polymer thereof, a mixture thereof or a copolymer mainly comprising any of the above-mentioned polymers in which the content of the syndiotacticity is preferably 75% or more, more preferably 85% or more in terms of a racemic diad, or it is preferably 30% or more, more preferably 50% or more in terms of a racemic pentad. Here, examples of the poly(alkylstyrene) include poly(methylstyrene), poly(ethylstyrene), poly(isopropylstyrene), poly(tert-butylstyrene), poly(phenylstyrene), poly(vinylnaphthalene) and poly(vinylstyrene). Examples of the poly(halogenated styrene) include poly(chlorostyrene), poly(bromostyrene) and poly(fluorostyrene). An example of the poly(halogenated alkylstyrene) is poly(chloromethylstyrene), and examples of the poly(alkoxystyrene) include poly(methoxystyrene) and poly(ethoxystyrene).

Above all, examples of the particularly preferable styrenic polymers include polystyrene, poly(p-methylstyrene), poly (m-methylstyrene), poly(p-tert-butylstyrene), poly(p-chlorostyrene), poly(m-chlorostyrene), poly(p-fluorostyrene), hydrogenated polystyrenes and copolymers having these constitutional units.

These styrenic polymers can be used singly or in a combination of two or more thereof.

No particular restriction is put on the molecular weight of this styrenic polymer, but its weight-average molecular weight is preferably 10000 or more, more preferably 50000 or more. In addition, the width of a molecular weight distribution is not limited, either, and the styrenic polymers having various molecular weight distributions are applicable. If the weight-average molecular weight is less than 10000, thermal properties and dynamic properties of an obtained composition or a molded article unpreferably deteriorate sometimes.

The styrenic polymer having the syndiotactic configuration can be prepared by, for example, polymerizing a styrenic monomer (which corresponds to the above-mentioned styrenic polymer) in the presence of a catalyst comprising a condensed product of a titanium compound, water and a trialkylaluminum in an inert hydrocarbon solvent or by the use of no solvent (Japanese Patent Application Laid-open No. 187708/1987). Furthermore, the poly(halogenated alkylstyrene) can be obtained by a method described in Japanese Patent Application Laid-open No. 46912/1989, and the hydrogenated polystyrene can be obtained by a method described in Japanese Patent Application Laid-open No. 178505/1989.

In the resin composition of the present invention, as the component (a), there can be used a modified SPS having a polar group capable of reacting with the component (b) which will be described hereinafter. This modified SPS can be obtained by modifying the SPS as the component (a) with a modifier. However, this preparation method of the modified SPS is not limited, and any other method can be used, so far as it is suitable for the object of the present invention.

No particular restriction is put on the kind of SPS to be modified, and the polymers mentioned above as the component (a) can be used, but a copolymer of styrene and a substituted styrene is particularly preferable from the viewpoint of the compatibility with another component. A composition ratio of the copolymer is not particularly restrictive, but the content of the substituted styrene is preferably in the range of 3 to 50 mol %. If this content is less than 3 mol %, the modification is difficult, and if it is more than 50 mol %, the compatibility with another component unpreferably deteriorates. Examples of the particularly preferable substituted styrene include alkylstyrenes such as methylstyrene, ethylstyrene, isopropylstyrene, tert-butylstyrene and vinylstyrene, halogenated styrenes such as chlorostyrene, bromostyrene and fluorostyrene, a halogenated alkylstyrene such as chloromethylstyrene, and alkoxystyrenes such as methoxystyrene and ethoxystyrene. These substituted styrenes can be used singly or in a combination of two or more thereof.

If the amount of the substituted styrene is 5% by weight or less based on the weight of the SPS, the polymer having an atactic structure is also usable. If the amount of the substituted styrene is more than 5% by weight, the heat resistance of the composition unpreferably deteriorates.

As the modifier which can be used to modify the SPS, there can be used a compound having an ethylenic double bond and a polar group in one molecule. Examples of such a modifier include maleic anhydride, maleic acid, maleic acid esters, maleimide and its N-substituted compounds, maleates, acrylic acid, acrylic acid esters, acrylic amide, acrylates, methacrylic acid, methacrylic acid esters, methacrylic amide, methacrylates and glycidyl methacrylate. Above all, maleic anhydride and glycidyl methacrylate are preferable. These modifiers can be used singly or in a combination of two or more thereof.

The modified SPS can be obtained by, for example, reacting the SPS with the modifier in the presence of a solvent and another resin. No particular restriction is put on a method of the modification, and there can be used a known method, for example, a method which comprises melting and kneading these materials at a temperature in the range of 150 to 350° C. by the use of a roll mill, a Banbury mixer or an extruder to carry out the reaction, or a method which comprises heating the materials in a solvent such as benzene, toluene or xylene to carry out the reaction. Furthermore, in order to facilitate this reaction, it is effective that a radical generator is allowed to exist in the reaction system, and examples of the radical generator include benzoyl peroxide, di-t-butyl peroxide, dicumyl peroxide, t-butyl peroxybenzoate, azobisisobutyronitrile, azobisisovaleronitrile and 2,3-diphenyl-2,3-dimethylbutane. A preferable method comprises melting and kneading the materials in the presence of the radical generator.

Among these modified SPSs, the maleic anhydride-modified SPS is particularly preferable. Moreover, the modified SPSs may be used singly or in a combination of two or more thereof.

In the resin composition of the present invention, a thermoplastic resin having a reactive polar group can be used as the component (b). This thermoplastic resin having the reactive polar group means a thermoplastic resin having at least one of polar groups such as a carboxyl group, a hydroxyl group and an amino group. Examples of the thermoplastic resin include polyethylene terephthalate, polypropylene terephthalate, polybutylene terephthalate, polycyclohexanedimethylene terephthalate, polyoxyethoxy benzoate, polyethylene naphthalate, widely defined polyesters such as polyesters obtained by copolymerizing the above-mentioned polyester-constituting components and other acid components such as isophthalic acid, p-oxybenzoic acid, adipic acid, sebacic acid, glutaric acid, diphenylmethane-dicarboxylic acid and dimer acid and/or glycol components such as hexamethylene glycol, diethylene glycol, neopentyl glycol, bisphenol A and neopentyl glycol alkylene oxide adducts, aromatic polyester-polyether block copolymers, aromatic polyester-polylactone block copolymers and polyallylates, polyamides, polycarbonates, polyolefins such as polar group-modified polyethylenes and polar group-modified polypropylenes, and polyarylene sulfide. Above all, polyamides are particularly preferable.

As the polyamides, all of known polyamides are usable. Suitable examples of the polyamides include 4-polyamide, 6-polyamide, 6,6-polyamide, 3,4-polyamide, 4,6-polyamide, 12-polyamide, 11-polyamide, 6,10-polyamide, a polyamide obtained from terephthalic acid and 4,4'-diaminohexylmethane, a polyamide obtained from azelaic acid, adipic acid and 2,2-bis(p-cyclohexyl)propane, and a polyamide such as adipic acid and m-xylyilenediamine.

The aromatic polyamide resin is a polyamide polymer having, as a repeating constitutional unit, an amide bond in which an aromatic ring is present in a main chain, and it can be suitably selected from the group consisting of polymers obtained by reacting aromatic diamine components with dicarboxylic acid components in an ordinary manner and polymers obtained by reacting diamine components and dicarboxylic acid components each having an aromatic ring in an ordinary manner.

Here, examples of the aromatic diamine components include diamines each having a benzene ring such as 1,4-diaminobenzene, 1,3-diaminobenzene, 1,2-diaminobenzene, 2,4-diaminotoluene, 2,3-diaminotoluene, 2,5-diaminotoluene, 2,6-diaminotoluene, ortho-, meta- and para-xylylenediamines, ortho-, meta- and para-2,2'-diaminodiethylbenzene, 4,4'-diaminobiphenyl, 4,4'-diaminodiphenylmethane, 4,4'-diamino diphenyl ether, 4,4'-diamino diphenylthio ether, 4,4'-diamino diphenyl ketone and 4,4'-diaminodiphenyl sulfone. As the aromatic diamine component, the above-mentioned diamine having the benzene ring may be used singly, or another aromatic diamine component, for example, a mixture of the aromatic diamine and an aliphatic diamine can also be used, so long as it contains the benzene ring. Needless to say, a mixture of two or more kinds of diamines each having the benzene ring may also be used.

Next, examples of the dicarboxylic acid components include aliphatic dicarboxylic acids such as glutaric acid, adipic acid, pimelic acid, suberic acid, azelaic acid and sebacic acid, aromatic dicarboxylic acids such as phthalic acid, isophthalic acid, terephthalic acid and naphthalene-dicarboxylic acid, and esters and acid chlorides of these dicarboxylic acids. They may be used singly or in a combination of two or more thereof.

Furthermore, the aromatic polyamide resin can also be obtained by polymerizing a ω-amino-ω-carboxyl compound having the aromatic ring, and examples of the ω-amino-ω-carboxyl compound having the aromatic ring include 4-amino-phenylcarboxylmethane, 1-(4-aminophenyl)-2-carboxylethane, 3-(4-aminophenyl)-1-carboxylpropane and p-(3-amino-3'-carboxyl)dipropylbenzene.

The preferable aromatic polyamide resin is a polyamide derived from the diamine having the benzene ring and the aliphatic dicarboxylic acid, and the more preferable aromatic polyamide resin is a polyamide derived from xylylenediamine and adipic acid.

This thermoplastic resin having the reactive polar group which is the component (b) may be used singly or in a combination of two or more thereof.

In the resin composition of the present invention, as the component (c), there can be used a compatibilizing agent having compatibility with the component (a) and a polar group capable of reacting with the component (b). This compatibilizing agent can be blended for the purposes of improving the compatibility between the components (a) and (b), finely dispersing a domain, and improving surface strength.

The polar group capable of reacting with the component (b) in the component (c) means a functional group capable of reacting with the polar group which the component (b) has, and typical examples of such a functional group include acid anhydride groups, carboxylic acid groups, carboxylic acid ester groups, carboxylic acid chloride groups, carboxylic amide groups, carboxylate groups, a sulfonic acid group, sulfonic acid ester groups, sulfonic acid chloride groups, sulfonic amide groups, sulfonate groups, an epoxy group, an amino group, imide groups and an oxazoline group.

The moiety having the compatibility with the component (a) means a moiety having a skeleton which is compatible with the SPS of the component (a), and typical examples of the moiety having the compatibility include moieties each having a styrenic chain, a styrenic copolymer segment or a polyphenylene ether segment as a main chain, a block or a graft chain.

Typical examples of the compatibilizing agent which can be used as the component (c) include styrene-maleic anhydride copolymer (SMA), styrene-glycidyl methacrylate copolymer, terminal carboxylic acid-modified polystyrene, terminal oxazoline-modified polystyrene, terminal amino-modified polystyrene, sulfonated polystyrene, styrenic ionomer, styrene-methyl methacrylate graft copolymer, (styrene-glycidyl methacrylate)-methyl methacrylate graft copolymer, acid-modified acryl-styrene graft copolymer, (styrene-glycidyl methacrylate)-styrene graft copolymer, polybutylene terephthalate-polystyrene graft copolymer, modified SPSs such as maleic anhydride-modified SPS, glycidyl methacrylate-modified SPS and amine-modified SPS, and modified polyphenylene ethers such as (styrene-maleic anhydride)-polyphenylene ether graft copolymer, maleic anhydride-modified polyphenylene ether, glycidyl methacrylate-modified polyphenylene ether and amine modified polyphenylene ether. Above all, modified SPSs and modified polyphenylene ethers are particularly preferable.

Examples of the above-mentioned modified SPS include the same modified SPSs as mentioned above as the examples of the component (a). Furthermore, the modified polyphenylene ether can be obtained by modifying a known polyphenylene ether with a modifier, but this manner is not restrictive and another procedure can also be used, so far as it is suitable for the object of the present invention.

The polyphenylene ether is a known compound, and for the sake of the modification of the polyphenylene ether, there can be referred to the specifications of U.S. Pat. Nos. 3,306,874, 3,306,875, 3,257,357 and 3,257,358. The polyphenylene ether can be prepared by an oxidizing coupling reaction for producing a homopolymer or a copolymer in the presence of a copper amine complex and one or more phenols each substituted at two or three positions. Here, as the copper amine complex, there can be used copper amine complexes derived from primary, secondary and tertiary amines. Suitable examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether), poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly-(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether).

In addition, for example, copolymers can also properly be used which can be derived from two or more kinds of such phenol compounds as to be used in the preparation of the above-mentioned homopolymers. Moreover, for example, there can also be used graft copolymers and block copolymers of aromatic vinyl compounds such as polystyrene and the above-mentioned polyphenylene ethers. Above all, poly (2,6-dimethyl-1,4-phenylene ether) is particularly preferable.

As the modifier which can be used to modify the polyphenylene ether, there can be used a compound having an ethylenic double bond and a polar group in one molecule. Examples of such a modifier include maleic anhydride, maleic acid, maleic acid esters, maleimide and its N-substituted compounds, maleates, fumaric acid, acrylic acid, acrylic acid esters, acrylic amide, acrylates, methacrylic acid, methacrylic acid esters, methacrylic amide, methacrylates and glycidyl methacrylate. Above all, maleic anhydride, fumaric acid and glycidyl methacrylate are preferable. These modifiers can be used singly or in a combination of two or more thereof.

The modified polyphenylene ether can be obtained by, for example, reacting the polyphenylene ether with the modifier in the presence of a solvent and another resin. No particular restriction is put on a method of the modification, and there can be used a known method, for example, a method which comprises melting and kneading these materials at a temperature in the range of 150 to 350° C. by the use of a roll mill, a Banbury mixer or an extruder to carry out the reaction, or a method which comprises heating the materials in a solvent such as benzene, toluene or xylene to carry out the reaction. Furthermore, in order to facilitate this reaction, it is effective that a radical generator is allowed to exist in the reaction system, and examples of the radical generator include benzoyl peroxide, di-t-butyl peroxide, dicumyl peroxide, t-butyl peroxybenzoate, azobisisobutyronitrile, azobisisovaleronitrile and 2,3-diphenyl-2,3-dimethylbutane. A preferable method comprises melting and kneading the materials in the presence of the radical generator.

Among these modified polyphenylene ethers, maleic anhydride-modified polyphenylene ether and fumaric acid-modified polyphenylene ether are particularly preferable.

In the resin composition of the present invention, the blend ratio of the above-mentioned components (a), (b) and (c) can fluctuate in a wide range, but a weight ratio of the component (a)/the component (b) is preferably 1.5 or less, more preferably in the range of 0.3 to 1.5, most preferably 0.5 to 1.2. If the weight ratio of the component (a)/the component (b) is more than 1.5, the component (a) becomes a matrix, so that mechanical strength deteriorates sometimes. The amount of the component (c) to be blended is preferably in the range of 0.5 to 10% by weight, more preferably 2 to 10% by weight, most preferably 3 to 8% by weight with respect to 100% by weight of the total of the components (a), (b) and (c). If the amount of the component (c) is less than 0.5% by weight, a compatibility effect of the SPS with the polyamide is not exerted, so that the failure of dispersion and the deterioration of interfacial strength take place sometimes, and if it is more than 10% by weight, the crystallinity of the SPS is impaired, so that heat resistance deteriorates sometimes.

The resin composition of the present invention further contains a flame retardant as the component (d). No particular restriction is put on the kind of flame retardant, and so the various flame retardants can be used. However, since a kneading and molding temperature is 280° C., it is important that the flame retardant is excellent in heat resistance in the process. In addition, since the flame retardancy of the whole system can be sufficiently improved by making the thermoplastic resin phase of the component (b) flame retardant, it is necessary that the flame retardant should locally exist in the thermoplastic resin phase. As the flame retardant, organic halogen-containing flame retardants are particularly preferable. Examples of the halogen-containing flame retardants include halogenated epoxy compounds, brominated polystyrenes such as pentabromobenzyl acrylate, halogenated amide compounds, poly(dibromophenylene oxide), polytribromostyrene and polydibromostyrene, tetrabromobisphenol A, tetrabromophthalic anhydride, hexabromobenzene, tribromophenyl allyl ether, pentabromotoluene, pentabromophenol, tribromophenyl-2,3-dibromo-propyl ether, tris(2,3-dibromopropyl) phosphate, tris(2-chloro-3-bromopropyl) phosphate, octabromodiphenyl ether, decabromodiphenyl ether, octabromobiphenyl, pentachloropentacyclodecane, hexabromocyclododecane, hexachlorobenzene, pentachlorotoluene, hexabromobiphenyl, decabromobiphenyl, tetrabromobutane, decabromodiphenyl ether, hexabromodiphenyl ether, ethylene-bis(tetrabromophthalimide), tetrachlorobisphenol A, tetrabromobisphenol A, tetrachlorobisphenol A, oligomers of halogenated polycarbonates such as oligomers of tetrabromobisphenol A and oligomers of brominated polycarbonates, polychlorostyrene and bis(tribromophenoxy)ethane.

Among these flame retardants, the brominated polystyrenes and poly(dibromophenylene oxide) are particularly preferable. The brominated polystyrenes include polydibromostyrene, polytribromostyrene and copolymers of these styrene compounds. The brominated polystyrene may be prepared by brominating polystyrene or polymerizing styrene bromide. The bromine content in each of these flame retardants is preferably 50% or more.

The amount of the flame retardant to be blended is preferably 10 parts by weight or more, more preferably in the range of 10 to 30 parts by weight, most preferably 15 to 25 parts by weight with respect to 100 parts by weight of the total of the components (a), (b) and (c). If the amount of the flame retardant is less than 10 parts by weight, it is difficult to obtain the flame retardancy as high as an oxygen index of 25 or more.

In the case that the brominated polystyrene is used as the flame retardant, a weight ratio of the component (c)/[the component (a)+the component (c)] is preferably 0.06 or more, more preferably in the range of 0.06 to 0.2. Furthermore, in the case that poly(dibromophenylene oxide) is used as the flame retardant, a weight ratio of the component (c)/[the component (a)+the component (c)] is preferably 0.06 or less, more preferably in the range of 0.02 to 0.06. If the ratio deviates from this range, the mechanical strength deteriorates sometimes.

In the present invention, it is necessary that a flame retardant auxiliary as the component (e) should be used together with the flame retardant as the component (d), and if either of these agents is omitted, the effect of the present invention cannot be obtained.

Here, no particular restriction is put on the kind of flame retardant auxiliary, and examples of the flame retardant auxiliary include antimony flame retardant auxiliaries such as antimony trioxide, antimony tetroxide, antimony pentoxide, sodium antimonate, metallic antimony, antimony trichloride, antimony pentachloride, antimony trisulfide and antimony pentasulfide. In addition to these compounds, zinc borate, barium metaborate and zirconium oxide can also be used. Above all, antimony trioxide is particularly preferable.

The amount of the flame retardant auxiliary as the component (e) to be used is preferably 3 parts by weight or more, more preferably in the range of 3 to 10 parts by weight with respect to 100 parts by weight of the total of the components (a), (b) and (c). If the amount of the flame retardant auxiliary is less than 3 parts by weight, it is difficult to obtain the flame retardancy as high as an oxygen index of 25 or more.

The resin composition of the present invention comprises the above-mentioned components (a) to (e) as the essential components, but it may further contain (f) a rubbery elastomer having a polar group capable of reacting with the component (b) and a portion compatible with the component (a) and/or (g) a core shell type particulate elastomer having a siloxane.

The rubbery elastomer having the polar group capable of reacting with the component (b) and the portion compatible with the component (a) which can be used as the component (f) is blended so as to improve impact resistance, elongation and toughness.

Here, the polar group capable of reacting with the component (b) means a functional group capable of reacting with a polar group which the component (b) has, and typical examples of the polar group include acid anhydride groups, carboxylic acid groups, carboxylic acid ester groups, carboxylic acid chloride groups, carboxylic amide groups, carboxylate groups, a sulfonic acid group, sulfonic acid ester groups, sulfonic acid chloride groups, sulfonic amide groups, sulfonate groups, an epoxy group, an amino group, imide groups and an oxazoline group.

Furthermore, the portion compatible with the component (a) means a chain having affinity for the SPS or the modified SPS as the component (a), and typical examples of the compatible portion include a main chain, a block and a graft chain having a styrene chain, a styrene copolymer segment and a polyphenylene ether segment as well as random copolymer rubbers having styrenic monomer units.

Examples of the rubbery elastomer which can be used as the component (f) include styrene-butyl acrylate copolymer rubber, and rubbers obtained by modifying, with the modifiers having the polar group, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), styrene-butadiene random copolymer, hydrogenated styrene-butadiene random copolymer, styrene-ethylene-propylene random copolymer and styrene-ethylene-butylene random copolymer. Above all, rubbers obtained by modifying SEB, SEBS, SEP and SEPS are particularly preferable. Typical examples of the rubbery elastomer include maleic anhydride-modified SEBS, maleic anhydride-modified SEPS, epoxy-modified SEBS and epoxy-modified SEPS.

These rubbery elastomers as the component (f) may be used singly or in a combination of two or more thereof. The amount of the rubbery elastomer to be blended is preferably in the range of 1 to 30 parts by weight, more preferably 3 to 20 parts by weight with respect to 100 parts by weight of the total of the components (a), (b) and (c). If the amount of the rubbery elastomer is less than 1 part by weight, the improvement effect of the impact resistance cannot sufficiently be exerted, and if it is more than 30 parts by weight, the elasticity and the heat resistance of the obtained composition deteriorate sometimes.

Furthermore, as the component (g), there can be used a core shell type particulate elastomer having a siloxane which is effective for the impartment of the flame retardancy. As the component (g), methyl methacrylate-alkyl acrylate-dimethylsiloxane copolymer core shell rubber (MASS) is preferable.

The amount of the component (g) to be blended is preferably in the range of 1 to 30 parts by weight, more preferably 3 to 20 parts by weight with respect to 100 parts by weight of the total of the components (a), (b) and (c). If the amount of the component (g) is less than 1 part by weight, the improvement effect of the impact resistance cannot sufficiently be exerted, and if it is more than 30 parts by weight, the elasticity and the heat resistance of the obtained composition deteriorate sometimes.

In addition, no particular restriction is put on the particle diameter of the core shell rubber, but it should be selected preferably in the range of 0.05 to 1.5 $\mu$m, more preferably 0.1 to 1.0 $\mu$m. If the particle diameter of the core shell rubber is less than 0.05 $\mu$m, the improvement effect of the impact resistance is not always sufficient, and conversely, if it is more than 1.5 $\mu$m, the dispersion state of the core shell rubber is poor, so that the improvement of the impact resistance cannot effectively be attained.

Moreover, the resin composition of the present invention can contain an inorganic filler as the component (h). No particular restriction is put on the form of this inorganic filler, and it may take any of a fibrous form, a grainy form or a powdery form. Examples of the fibrous filler include a glass fiber, a carbon fiber and a whisker, and examples of the morphology of the fibrous filler include a cloth, a mat, a cut bundle, a short fiber, a filament and a whisker. In the case of the cut bundle, its length is preferably in the range of 0.05 to 50 mm, and a fiber diameter is preferably in the range of 5 to 20 $\mu$m. On the other hand, examples of the grainy and the powdery fillers include talc, carbon black, graphite, titanium dioxide, silica, mica, calcium carbonate, calcium sulfate, barium carbonate, magnesium carbonate, magnesium sulfate, barium sulfate, calcium oxysulfate, tin oxide, alumina, kaolin, silicon carbide, metallic powder, glass powder, glass flakes and glass beads. Among these fillers, glass fillers such as glass powder, glass flakes, glass beads, glass filaments, glass fibers, glass rovings and glass mats are particularly preferable.

The above-mentioned filler is preferably subjected to a surface treatment with a coupling agent. This coupling agent for use in the surface treatment is used to improve the adhesive properties of the filler to the resin, and the coupling agent can optionally be selected from conventional known agents such as the so-called silane coupling agents and titanium coupling agents. Above all, preferable are aminosilanes such as $\gamma$-aminopropyltrimethoxysilane, N-$\beta$-(aminomethyl)-$\gamma$-aminopropyltrimethoxysilane, $\gamma$-glycidoxypropyltrimethoxysilane and $\beta$-(3,4-epoxycyclohexyl)ethyltrimethoxysilane, epoxy silane and isopropyl-tri(N-amidoethyl, aminoethyl) titanate.

These inorganic fillers may be used singly or in a combination of two or more thereof. The amount of the filler to be blended is preferably in the range of 1 to 350 parts by weight, more preferably 5 to 200 parts by weight with respect to 100 parts by weight of the composition. If the amount of the filler is less than 1 part by weight, the blend effect of the filler cannot sufficiently be exerted, and if it is more than 350 parts by weight, dispersion properties deteriorate, so that the molding inconveniently becomes difficult.

To the resin composition of the present invention, various additives and/or another thermoplastic resin can be added, so far as the object of the present invention is not impaired. Examples of the additives include an antioxidant, a nucleating agent, a plasticizer, a release agent, a flame retardant, a pigment, carbon black, an antistatic agent.

By the use of the resin composition of the present invention, molded articles having excellent physical properties and high flame retardancy can be obtained, irrespective of a molding method. Therefore, the resin composition of the present invention is suitable for the manufacture of molded articles in which the flame retardancy is required, for example, automobile parts such as connectors and cylinder head covers to be carried on automobiles, electric and electronic materials such as connectors, and the like.

Next, the present invention will be described in more detail, but the scope of the present invention should not be limited at all by these examples.

Incidentally, the physical properties of the resin composition were obtained by the following procedures.

(1) Izod impact strength (notched or unnotched): It was measured in accordance with JIS K-7110.

(2) Elongation: It was measured in accordance with JIS K-7113.

EXAMPLE 1

20 parts by weight of a brominated polystyrene (hereinafter abbreviated to "Br—PS") (trade name PYRO-CHEK 68PB, made by Nissan Fero Organic Chemistry Co., Ltd.) as a flame retardant and 7 parts by weight of antimony trioxide (trade name ATOX-S, made by The Nihon Mining & Concentrating Co., Ltd.) as a flame retardant auxiliary were added to 100 parts by weight of the total of 26.4% by weight of SPS (weight–average molecular weight=400,000), 70% by weight of 6,6-nylon (trade name 2015B, made by Ube Industries, Ltd.) and 3.6% by weight of maleic anhydride-modified polyphenylene ether (hereinafter abbreviated to "MA-PPO") as a compatibilizing agent, and the mixture was molten, kneaded and then pelletized by a twin screw extruder.

The thus obtained pellets were injection molded to obtain a test piece for a tensile test, a test piece for an Izod test and a test piece for a combustion test. For the thus obtained test pieces, Izod impact strength, elongation and an oxygen index were measured, and SEM (surface scanning electron microscope) observation was then carried out. In the SEM observation, the surface of the test piece was exposed by a cutting microtome, and SPS was only etched to evaluate a matrix and a domain. The results are shown in Table 1.

In this example, SPS (a)/6,6-nylon (b) was 0.37 and MA-PPO (c)/[SPS (a)+MA-PPO (c)] was 0.12, and 6,6-nylon was the matrix as shown in Table 1, whereby mechanical properties were improved.

COMPARATIVE EXAMPLE 1

The same procedure as in Example 1 was repeated except that the amount of SPS was 66.4% by weight and that of 6,6-nylon was 30% by weight, and the results are shown in Table 1.

In this comparative example, SPS (a)/6,6-nylon (b) was 2.2, and MA-PPO (c)/[SPS (a)+MA-PPO (c)] was 0.05.

TABLE 1

| Composition and Characteristics | | Example 1 | Comp. Ex. 1 |
| --- | --- | --- | --- |
| SPS | (wt %) | 26.4 | 66.4 |
| 6,6-nylon | (wt %) | 70 | 30 |
| MA-PPO | (wt %) | 3.6 | 3.6 |
| Flame Retardant (Br-PS) | (pts. wt.) | 20 | 20 |

TABLE 1-continued

| Composition and Characteristics | | Example 1 | Comp. Ex. 1 |
| --- | --- | --- | --- |
| Flame Retardant Auxiliary ($Sb_2O_3$) | (pts. wt.) | 7 | 7 |
| Oxygen Index | (%) | 26.0 | 24.0 |
| Izod Impact Strength | | | |
| Notched | (KJ/m$^2$) | 1.6 | 1.2 |
| Unnotched | (KJ/m$^2$) | 28.9 | 15.7 |
| Elongation | (%) | 2.6 | 1.9 |
| Matrix Resin | | 6,6-nylon | SPS |

EXAMPLE 2

20 parts by weight of Br—PS (trade name PYRO-CHEK 68PB, made by Nissan Fero Organic Chemistry Co., Ltd.) as a flame retardant and 7 parts by weight of antimony trioxide (trade name ATOX-S, made by The Nihon Mining & Concentrating Co., Ltd.) as a flame retardant auxiliary were added to 100 parts by weight of the total of 44% by weight of SPS (weight–average molecular weight=400,000), 50% by weight of 6,6-nylon (trade name 2015B, made by Ube Industries, Ltd.) and 6% by weight of MA-PPO as a compatibilizing agent, followed by the same procedure as in Example 1. The results are shown in Table 2. The dispersion state of the flame retardant was observed by TEM (a transmission electron microscope) to judge whether the flame retardant was dispersed in a matrix or a domain.

In this example, SPS (a)/6,6-nylon (b) was 0.88, and MA-PPO (c)/[SPS (a)+MA-PPO (c)] was 0.12. As shown in Table 2, in the case of MA-PPO (c)/[SPS (a)+MA-PPO (c)]>0.06, Br—PS was dispersed in the 6,6-nylon matrix, whereby flame retardancy and mechanical properties were both improved.

EXAMPLE 3

20 parts by weight of Br—PS (trade name PYRO-CHEK 68PB, made by Nissan Fero Organic Chemistry Co., Ltd.) as a flame retardant and 7 parts by weight of antimony trioxide (trade name ATOX-S, made by The Nihon Mining & Concentrating Co., Ltd.) as a flame retardant auxiliary were added to 100 parts by weight of the total of 48% by weight of SPS (weight–average molecular weight=400,000), 50% by weight of 6,6-nylon (trade name 2015B, made by Ube Industries, Ltd.) and 2% by weight of MA-PPO as a compatibilizing agent, followed by the same procedure as in Example 1. The results are shown in Table 2.

In this example, SPS (a)/6,6-nylon (b) was 0.96, and MA-PPO (c)/[SPS (a)+MA-PPO (c)] was 0.04.

TABLE 2

| Composition and Characteristics | | Example 2 | Example 3 |
| --- | --- | --- | --- |
| SPS | (wt %) | 44 | 48 |
| 6,6-nylon | (wt %) | 50 | 50 |
| MA-PPO | (wt %) | 6 | 2 |
| Flame Retardant (Br-PS) | (pts. wt.) | 20 | 20 |
| Flame Retardant Auxiliary ($Sb_2O_3$) | (pts. wt.) | 7 | 7 |
| Oxygen Index | (%) | 26.0 | 25.0 |
| Izod Impact Strength | | | |
| Notched | (KJ/m$^2$) | 1.8 | 1.5 |
| Unnotched | (KJ/m$^2$) | 23.0 | 21.5 |

TABLE 2-continued

| Composition and Characteristics | | Example 2 | Example 3 |
|---|---|---|---|
| Elongation | (%) | 2.8 | 2.8 |
| Matrix Resin | | 6,6-nylon | 6,6-nylon |
| Dispersion of Flame Retardant | | 6,6-nylon | SPS |

EXAMPLE 4

21 parts by weight of poly(dibromophenylene oxide) (hereinafter abbreviated to "Br-PPO") (trade name PO64P, made by GLC Co., Ltd.) (a bromine amount was regulated in terms of a brominated polystyrene) as a flame retardant was added to 100 parts by weight of the total of 48% by weight of SPS (weight–average molecular weight=400,000), 50% by weight of 6,6-nylon (trade name 2015B, made by Ube Industries, Ltd.) and 2% by weight of MA-PPO as a compatibilizing agent, followed by the same procedure as in Example 2. The results are shown in Table 3.

In this example, SPS (a)/6,6-nylon (b) was 0.96, and MA-PPO (c)/[SPS (a)+MA-PPO (c)] was 0.04. As shown in Table 3, in the case of MA-PPO (c)/[SPS (a)+MA-PPO (c)]<0.06, Br-PPO was dispersed in the 6,6-nylon matrix, whereby flame retardancy and mechanical properties were both improved.

EXAMPLE 5

The same procedure as in Example 4 was repeated except that the amount of SPS was 44% by weight and that of MA-PPO was 6% by weight, and the results are shown in Table 3.

In this example, SPS (a)/6,6-nylon (b) was 0.88, and MA-PPO (c)/[SPS (a)+MA-PPO (c)] was 0.12.

TABLE 3

| Composition and Characteristics | | Example 4 | Example 5 |
|---|---|---|---|
| SPS | (wt %) | 48 | 44 |
| 6,6-nylon | (wt %) | 50 | 50 |
| MA-PPO | (wt %) | 2 | 6 |
| Flame Retardant (Br-PPO) | (pts. wt.) | 21 | 21 |
| Flame Retardant Auxiliary ($Sb_2O_3$) | (pts. wt.) | 7 | 7 |
| Oxygen Index | (%) | 26.5 | 25.5 |
| Izod Impact Strength | | | |
| Notched | ($KJ/m^2$) | 1.4 | 1.1 |
| Unnotched | ($KJ/m^2$) | 21.0 | 19.4 |
| Elongation | (%) | 2.7 | 2.4 |
| Matrix Resin | | 6,6-nylon | 6,6-nylon |
| Dispersion of Flame Retardant | | 6,6-nylon | SPS |

EXAMPLE 6

20 parts by weight of Br—PS (trade name PYRO-CHEK 68PB, made by Nissan Fero Organic Chemistry Co., Ltd.) and 7 parts by weight of antimony trioxide (trade name ATOX-S, made by The Nihon Mining & Concentrating Co., Ltd.) were added to 100 parts by weight of the total of 34% by weight of SPS (weight–average molecular weight=400,000), 50% by weight of 6,6-nylon (trade name 2015B, made by Ube Industries, Ltd.), 6% by weight of MA-PPO as a compatibilizing agent and 10% by weight of maleic anhydride-modified hydrogenated styrene-butadiene-styrene block copolymer (herein after abbreviated to "MA-SEBS" sometimes) (trade name MX-072, made by Asahi Chemical Industry Co., Ltd.) as a rubbery elastomer of a component (f), followed by the same procedure as in Example 1. The results are shown in Table 4.

EXAMPLE 7

20 parts by weight of Br—PS (trade name PYRO-CHEK 68PB, made by Nissan Fero Organic Chemistry Co., Ltd.) and 7 parts by weight of antimony trioxide (trade name ATOX-S, made by The Nihon Mining & Concentrating Co., Ltd.) were added to 100 parts by weight of the total of 34% by weight of SPS (weight–average molecular weight=400,000), 50% by weight of 6,6-nylon (trade name 2015B, made by Ube Industries, Ltd.), 6% by weight of MA-PPO as a compatibilizing agent and 10% by weight of methyl methacrylate-alkyl acrylate-dimethylsiloxane copolymer as a core shell type particulate elastomer (made by Mitsubishi Rayon Co., Ltd.) (hereinafter abbreviated to "MASS" sometimes) which was a component (g), followed by the same procedure as in Example 1. The results are shown in Table 4.

EXAMPLE 8

20 parts by weight of Br—PS (trade name PYRO-CHEK 68PB, made by Nissan Fero Organic Chemistry Co., Ltd.) and 7 parts by weight of antimony trioxide (trade name ATOX-S, made by The Nihon Mining & Concentrating Co., Ltd.) were added to 100 parts by weight of the total of 34% by weight of SPS (weight–average molecular weight=400,000), 50% by weight of 6,6-nylon (trade name 2015B, made by Ube Industries, Ltd.), 6% by weight of MA-PPO as a compatibilizing agent, 5% by weight of MA-SEBS and 5% by weight of MASS, followed by the same procedure as in Example 1. The results are shown in Table 4.

EXAMPLE 9

The same procedure as in Example 8 was repeated except that the amount of SPS was 38% by weight, that of MA-PPO was 2% by weight, and 21 parts by weight of Br-PPO (trade name PO64P, made by GLC Co., Ltd.) (a bromine amount was regulated in terms of a brominated polystyrene) was used as a flame retardant, and the results are shown in Table 4.

EXAMPLE 10

The same procedure as in Example 6 was repeated except that the amount of SPS was 44% by weight and neither a rubbery elastomer nor a particulate elastomer was used, and the results are shown in Table 4.

EXAMPLE 11

The same procedure as in Example 9 was repeated except that the amount of SPS was 44% by weight and neither a rubbery elastomer nor a particulate elastomer was used, and the results are shown in Table 4.

Comparing Examples 6, 7 and 8 with Example 10, and comparing Example 9 with Example 11, it is apparent that toughness can be improved, maintaining flame retardancy, by adding the component (f) and/or the component (g).

TABLE 4

| Composition and Characteristics | | Example | | | | | |
|---|---|---|---|---|---|---|---|
| | | 6 | 7 | 8 | 9 | 10 | 11 |
| SPS | (wt %) | 34 | 34 | 34 | 38 | 44 | 44 |
| 6,6-nylon | (wt %) | 50 | 50 | 50 | 50 | 50 | 50 |

TABLE 4-continued

| Composition and Characteristics | | Example | | | | | |
|---|---|---|---|---|---|---|---|
| | | 6 | 7 | 8 | 9 | 10 | 11 |
| MA-PPO | (wt %) | 6 | 6 | 6 | 2 | 6 | 6 |
| MA-SEBS | (wt %) | 10 | 0 | 5 | 5 | 0 | 0 |
| MASS | (wt %) | 0 | 10 | 5 | 5 | 0 | 0 |
| Flame Retardant | (pts. wt.) | 20 | 20 | 20 | 21 | 20 | 21 |
| $Sb_2O_3$ | (pts. wt.) | 7 | 7 | 7 | 7 | 7 | 7 |
| Oxygen Index | (%) | 25.5 | 33.0 | 31.0 | 30.0 | 26.0 | 25.5 |
| Izod Impact Strength | | | | | | | |
| Notched | (KJ/m$^2$) | 2.9 | 2.6 | 3.5 | 2.8 | 1.8 | 1.1 |
| Unnotched | (KJ/m$^2$) | 33.9 | 29.7 | 38.1 | 36.1 | 23.0 | 19.4 |
| Elongation | (%) | 3.4 | 3.0 | 3.9 | 3.5 | 2.8 | 2.4 |

EXAMPLE 12

20 parts by weight of Br—PS (trade name PYRO-CHEK 68PB, made by Nissan Fero Organic Chemistry Co., Ltd.), 7 parts by weight of antimony trioxide (trade name ATOX-S, made by The Nihon Mining & Concentrating Co., Ltd.) and 30 parts by weight of a glass fiber (trade name JA-FT-2A, made by Asahi Fiber Glass Co., Ltd.) were added to 100 parts by weight of the total of 50% by weight of SPS and 50% by weight of 6,6-nylon (trade name 2015B, made by Ube Industries, Ltd.), followed by the same procedure as in Example 1. The results are shown in Table 5.

EXAMPLE 13

The same procedure as in Example 4 was repeated except that 30 parts by weight of a glass fiber was added, and the results are shown in Table 5.

EXAMPLE 14

The same procedure as in Example 8 was repeated except that 30 parts by weight of a glass fiber was added, and the results are shown in Table 5.

EXAMPLE 15

The same procedure as in Example 12 was repeated except that any glass fiber was not added, and the results are shown in Table 5.

EXAMPLE 16

The same procedure as in Example 13 was repeated except that any glass fiber was not added, and the results are shown in Table 5.

EXAMPLE 17

The same procedure as in Example 14 was repeated except that any glass fiber was not added, and the results are shown in Table 5.

Comparing Example 12 with Example 15, Example 13 with Example 16, and Example 14 with Example 17, it is apparent that impact strength can be improved, maintaining flame retardancy, by adding the glass fiber.

TABLE 5

| Composition and Characteristics | | Example | | | | | |
|---|---|---|---|---|---|---|---|
| | | 12 | 13 | 14 | 15 | 16 | 17 |
| SPS | (wt %) | 50 | 44 | 34 | 50 | 44 | 34 |
| 6,6-nylon | (wt %) | 50 | 50 | 50 | 50 | 50 | 50 |
| MA-PPO | (wt %) | 0 | 6 | 6 | 0 | 6 | 6 |
| MA-SEBS | (wt %) | 0 | 0 | 5 | 0 | 0 | 5 |
| MASS | (wt %) | 0 | 0 | 5 | 0 | 0 | 5 |
| Glass Fiber | (pts. wt.) | 30 | 30 | 30 | 0 | 0 | 0 |
| Flame Retardant | (pts. wt.) | 20 | 20 | 20 | 20 | 20 | 20 |
| $Sb_2O_3$ | (pts. wt.) | 7 | 7 | 7 | 7 | 7 | 7 |
| Oxygen Index | (%) | 26.0 | 33.0 | 33.5 | 25.5 | 26.0 | 31.1 |
| Izod Impact Strength | | | | | | | |
| Notched | (KJ/m$^2$) | 7.2 | 8.7 | 9.5 | 1.2 | 1.8 | 3.5 |
| Unnotched | (KJ/m$^2$) | 56.0 | 65.0 | 77.0 | 19.4 | 24.2 | 33.9 |

Possibility of Industrial Utilization

As described above, a resin composition of the present invention can exhibit a high flame retardancy, maintaining excellent mechanical properties, heat resistance, chemical resistance, water resistance, acid resistance, alkali resistance and the like of a resin composition such as an SPS/polyamide alloy which comprises an SPS and a thermoplastic resin having a reactive polar group. In the resin composition of the present invention, a flame retardant is dispersed in the thermoplastic resin matrix having the reactive polar group, whereby the flame retardancy and the mechanical strength can be improved. The addition of a specific rubbery elastomer and particulate elastomer can lead to the improvement of toughness, and the addition of an inorganic filler such as a glass fiber can also lead to the improvement of physical properties and can permit the supply of molded articles having an excellent stiffness.

Therefore, the resin composition of the present invention can suitably be used as industrial materials such as electric and electronic materials, industrial structure materials, automobile parts, appliance parts and mechanical parts.

What is claimed is:

1. A flame retardant resin composition, which comprises:
    (a) a syndiotactic styrenic polymer having a syndiotacticity of 30% or more in terms of a racemic pentad, and a weight average molecular weight of 10000 or more,
    (b) 6,6-nylon, (c) a maleic anhydride-polyphenylene ether compatibilizing agent, the percent amounts of components (a), (b) and (c) individually based on the sum of the percentage amounts of (a), (b) and (c), (d) a flame retardant and (e) a flame retardant auxiliary, the weight ratio of component (a)/component (b) being from 0.5 to 1.2, the amount of component (d) being 10–25 parts by weight and the amount of component (e) being 3–10 parts by weight each with respect to 100 parts by weight of the total of components (a), (b) and (c); and
    wherein component (d) is poly(dibromophenylene oxide), and the weight ratio of component(c)/(component (a)+ component (c)) is 0.02–0.06.

2. The flame retardant resin composition according to claim 1, further containing (h) an inorganic filler.

* * * * *